US012772080B2

(12) United States Patent
Shirke et al.

(10) Patent No.: US 12,772,080 B2
(45) Date of Patent: Oct. 20, 2026

(54) NOTIFICATION CONTROL IN CLOUD-NATIVE TELECOMMUNICATIONS NETWORKS

(71) Applicant: BOOST SUBSCRIBERCO L.L.C., Englewood, CO (US)

(72) Inventors: Abhishek Jayprakash Shirke, Aurora, CO (US); Prakash Patel, Castle Rock, CO (US); Mohammad Dawood Shahdad, Aurora, CO (US)

(73) Assignee: BOOST SUBSCRIBERCO L.L.C., Englewood, CO (US)

( * ) Notice: Subject to any disclaimer, the term of this patent is extended or adjusted under 35 U.S.C. 154(b) by 234 days.

(21) Appl. No.: 18/810,232

(22) Filed: Aug. 20, 2024

(65) Prior Publication Data

US 2026/0059354 A1 Feb. 26, 2026

(51) Int. Cl.

*H04W 12/06* (2021.01)
*H04W 24/04* (2009.01)
*H04W 28/24* (2009.01)

(52) U.S. Cl.

CPC ........... *H04W 24/04* (2013.01); *H04W 28/24* (2013.01)

(58) Field of Classification Search

CPC ............................... H04W 28/24; H04L 67/00
See application file for complete search history.

(56) References Cited

U.S. PATENT DOCUMENTS

| | | | | |
|---|---|---|---|---|
| 12,425,301 | B2 * | 9/2025 | Rodrigo | H04L 67/51 |
| 2023/0142427 | A1 * | 5/2023 | Shariat | H04L 41/14 709/224 |
| 2025/0219897 | A1 * | 7/2025 | Xu | H04L 41/0853 |
| 2025/0247417 | A1 * | 7/2025 | Asim | H04L 63/1441 |

OTHER PUBLICATIONS

ETSI, Technical Specification. 5G; 5G System; Network function repository services; Stage 3 (3GPP TS 29.510 version 16.6.0 Release 16) (2021).

* cited by examiner

*Primary Examiner* — Khalid W Shaheed
(74) *Attorney, Agent, or Firm* — Quarles & Brady, LLP

(57) ABSTRACT

Systems and methods of managing communication sessions perform or comprise transmitting an update request from a first network node to a second network node, wherein the second network node is associated with a Network Repository Function (NRF) and the first network node is associated with a producer Network Function (NF) that is a first consumer of services provided by the NRF; updating a profile associated with the producer NF based on the update request; determining whether a notification corresponding to the update request is expected to cause an error in a third network node, wherein the third network node is associated with a consumer NF that is a second consumer of services provided by the NRF and is subscribed to updates regarding the first network node; and in response to a determination that the notification is not expected to cause the error, transmitting the notification from the second network node to the third network node.

20 Claims, 7 Drawing Sheets

NOTIFICATION CONTROL IN CLOUD-NATIVE TELECOMMUNICATIONS NETWORKS

BACKGROUND

This disclosure relates to wireless data networks, such as 5G wireless networks. Wireless networks that transport digital data and telephone calls are becoming increasingly sophisticated. Currently, fifth generation (5G) broadband cellular networks are being deployed around the world. These 5G networks use emerging technologies to support data and voice communications with millions, if not billions, of mobile phones, computers, and other devices. 5G technologies are capable of supplying much greater bandwidths than previously available technologies.

The discussion above is merely provided for general background information and is not intended to be used as an aid in determining the scope of the claimed subject matter.

SUMMARY

Various aspects of the present disclosure relate to systems and methods in a telecommunications network to control notification flow to subscribed network functions.

According to one aspect of the present disclosure, a method of notification control in a telecommunications network is provided. The method comprises transmitting an update request from a first network node to a second network node, wherein the second network node is associated with a Network Repository Function (NRF) and the first network node is associated with a producer Network Function (NF) that is a first consumer of services provided by the NRF; updating a profile associated with the producer NF based on the update request; determining whether a notification corresponding to the update request is expected to cause an error in a third network node, wherein the third network node is associated with a consumer NF that is a second consumer of services provided by the NRF and is subscribed to updates regarding the first network node; and in response to a determination that the notification is not expected to cause the error, transmitting the notification from the second network node to the third network node.

According to another aspect of the present disclosure, a telecommunications network is provided. The network comprises at least one processor in communication with a first network node, wherein the first network node is associated with a Network Repository Function (NRF); and a memory storing instructions that, when executed by the at least one processor, cause the first network node to: receive an update request from a second network node, wherein the second network node is associated with a producer Network Function (NF) that is a first consumer of services provided by the NRF, update a profile associated with the producer NF based on the update request, determine whether a notification corresponding to the update request is expected to cause an error in a third network node, wherein the third network node is associated with a consumer NF that is a second consumer of services provided by the NRF and is subscribed to updates regarding the second network node, and in response to a determination that the notification is not expected to cause the error, transmit the notification from the first network node to the third network node.

According to another aspect of the present disclosure, a non-transitory computer-readable medium is provided. The non-transitory computer-readable medium stores instructions that, when executed by at least one processor of a first network node in a telecommunications network, cause the first network node to perform operations comprising receiving an update request from a second network node, wherein the first network node is associated with a Network Repository Function (NRF) and the second network node is associated with a producer Network Function (NF) that is a first consumer of services provided by the NRF; updating a profile associated with the producer NF based on the update request; determining whether a notification corresponding to the update request is expected to cause an error in a third network node, wherein the third network node is associated with a consumer NF that is a second consumer of services provided by the NRF and is subscribed to updates regarding the first network node; and in response to a determination that the notification is not expected to cause the error, transmitting the notification from the first network node to the third network node.

BRIEF DESCRIPTION OF THE DRAWINGS

The following drawings are provided to help illustrate various features of examples of the disclosure and are not intended to limit the scope of the disclosure or exclude alternative implementations.

DETAILED DESCRIPTION

Figure 1:
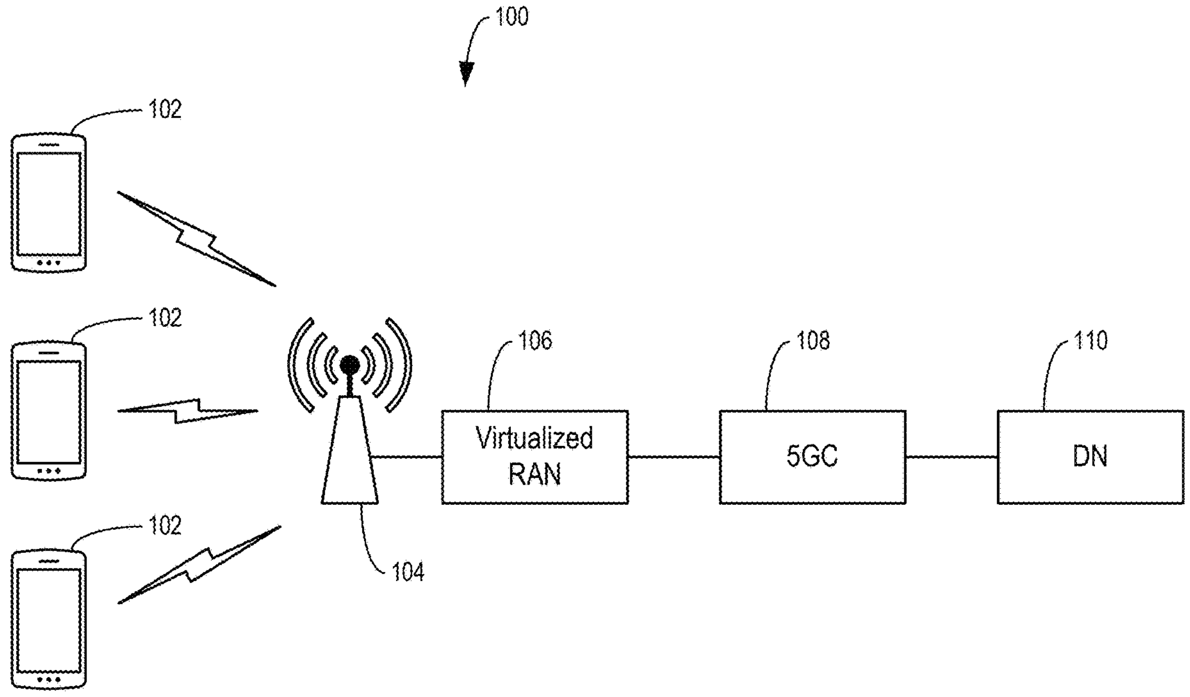
FIG. 1 illustrates an example of a telecommunications network in accordance with various aspects of the present disclosure.

The disclosed technology is not limited in its application to the details of construction and the arrangement of components set forth in the following description or illustrated in the following drawings. Other examples of the disclosed technology are possible and examples described and/or illustrated here are capable of being practiced or of being carried out in various ways. The terminology in this document is used for the purpose of description and should not be regarded as limiting. Words such as "including," "comprising," and "having" and variations thereof as used herein are meant to encompass the items listed thereafter, equivalents thereof, as well as additional items.

A plurality of hardware and software-based devices, as well as a plurality of different structural components can be used to implement the disclosed technology. In addition, examples of the disclosed technology can include hardware, software, and electronic components or modules that, for purposes of discussion, can be illustrated and described as if the majority of the components were implemented solely in hardware. However, in at least one example, the electronic based aspects of the disclosed technology can be implemented in software (for example, stored on non-transitory computer-readable medium) executable by one or more electronic processors. Although certain drawings illustrate hardware and software located within particular devices, these depictions are for illustrative purposes only. In some examples, the illustrated components can be combined or divided into separate software, firmware, hardware, or combinations thereof. As one example, instead of being located within and performed by a single electronic processor, logic and processing can be distributed among multiple electronic processors. Regardless of how they are combined or divided, hardware and software components can be located on the same computing device or can be distributed among different computing devices connected by one or more networks or other suitable communication links.

The present disclosure is directed to wireless communications networks, also referred to herein as telecommunications networks. The systems and methods set forth herein may be implemented on a telecommunications network in compliance with any telecommunication standard or group of standards; for example, fourth-generation (4G) network standards such as Long Term Evolution (LTE) and/or fifth-generation (5G) network standards such as New Radio (NR). In an example implementation, the wireless communications networks described herein may represent a portion of a wireless network built around 5G standards promulgated by standards setting organizations under the umbrella of the Third Generation Partnership Project ("3GPP"). Accordingly, in some configurations, the wireless communication network may be a 5G network, such as, e.g., a 5G cellular network. Such 5G networks, including the wireless communication networks described herein, may comply with industry standards, such as, e.g., the Open Radio Access Network (Open RAN or O-RAN) standard that describes interactions between the network and user equipment (e.g., mobile phones and the like).

The O-RAN model follows a virtualized model for a cloud-native 5G wireless architecture in which 5G base stations, referred to as next-generation Node Bs (gNBs), are implemented using separate centralized units (CUs), distributed units (DUs), and radio units (RUs). In some configurations, O-RAN CUs and DUs may be implemented using software modules executed by distributed (e.g., cloud) computing hardware. Virtualization allows for various other components of the cellular network, such as cellular network core functions, to be implemented as code that is executed using general-purpose computing resources. Such general-purpose computing resources can be part of a public cloud-computing platform that provides virtual private clouds (VPCs) for multiple clients. On a hybrid cloud cellular network, RAN components of the cellular network are in communication with components of the cellular network executed on a public cloud computing platform, such as Amazon Web Services (AWS).

FIG. 1 illustrates an example of a telecommunications network 100 in accordance with various aspects of the present disclosure. In the telecommunications network 100 of FIG. 1, a plurality of UEs 102 are connected to a wireless access point 104, which in turn is connected to a set of virtualized RAN components 106. The virtualized RAN components 106 provide a connection to a 5G core network (5GC) 108, which in turn provides a connection to a data network 110. The wireless access point 104 and the virtualized RAN components 106 may collectively be referred to as a next-generation RAN (NG-RAN).

In some configurations, the telecommunications network 100 may be a standalone (SA) network (e.g., a 5G SA network) that utilizes 5G cells for both signaling and information transfer via a 5G packet core architecture. However, the present disclosure may be implemented with any type of telecommunication network capable of being virtualized.

As used herein, the term "UE" may be one of various types of end-user devices, such as cellular phones, smartphones, cellular modems, cellular-enabled computerized devices, sensor devices, robotic equipment, vehicles, IoT devices, gaming devices, access points (Aps), or any computerized device capable of communicating via a cellular network. More generally, a UE 102 can represent any type of device that has an incorporated 5G interface, such as a 5G modem. Examples can include sensor devices, Internet of Things (IoT) devices, manufacturing robots, unmanned aerial (or land-based) vehicles, network-connected vehicles, etc. Depending on the location of individual UEs, a UE 102 may use RF to communicate with various base stations of a telecommunications network. While FIG. 1 illustrates three UEs 102 connected to the wireless access point 104, in practical implementations any number of UEs 102 may be connected to the wireless access point 104 at any given time.

The wireless access point 104 represents the physical infrastructure (e.g., a 5G tower) to which the UEs 102 connect. The wireless access point 104 may be any structure to which one or more antennas are mounted. The wireless access point 104 may be a dedicated cellular tower, a building, a water tower, or any other man-made or natural structure to which one or more antennas can reasonably be mounted to provide cellular coverage to a geographic area. The wireless access point 104 may include an RU configured to convert radio signals sent to and received from the antenna(s) into a digital signal. The wireless access point 104 is connected to the virtualized RAN components 106 via a fronthaul link over which the digital signals may be communicated. The virtualized RAN components 106 may include a DU connected to a CU via a midhaul link. The CU may be connected to the 5GC 108 via a backhaul link. While FIG. 1 illustrates a single wireless access point 104 and a single set of virtualized RAN components 106, in practical implementations the telecommunications network 100 may include any number of wireless access points 104 and/or any number of virtualized RAN components 106.

In one example, the telecommunications network 100 may be configured according to a region-based network topology. For example, the telecommunications network 100 may be implemented using a cloud computing platform that is logically and physically divided up into various different cloud computing regions (e.g., AWS regions). The cloud computing regions may be based on the geographical location of the gNBs; for example, the telecommunications network 100 for a given nation may be divided into a number of geographical regions. Each of the cloud computing regions can be isolated from other cloud computing regions to help provide fault tolerance, fail-over, load-balancing, and/or stability and each of the cloud computing regions can be composed of multiple availability zones or markets, each of which can be a separate data center located in general proximity to each other (e.g., within 100 miles). For example, one cloud computing region may have its datacenters and hardware located in the northeast of the United States while another cloud computing region may have its data centers and hardware located in California.

Each of the availability zones may be a discrete data center of a group of data centers that allows for redundancy, thereby to provide fail-over protection from other availability zones within the same cloud computing region. For example, if a particular data center of an availability zone experiences an outage, another data center of the availability zone or separate availability zone within the same cloud computing region can continue functioning and providing service. An availability zone may be divided into multiple local zones or areas-of-interest (AOIs). For instance, a client, such as a provider of the telecommunications network 100, can select from more options of the computing resources that can be reserved at an availability zone compared to a local zone. However, a local zone may provide computing resources nearby geographic locations where an availability zone is not available. Each local zone may be divided into multiple gNBs, each of which can serve one or more sites. A site may have one DU and a number of RUs (e.g., six RUs) assigned to it.

The 5GC 108 provides a plurality of 5G core functions. In the topology of a 5G NR cellular network, 5G core functions of 5GC 108 can logically reside as part of a national data center (NDC). An NDC can be understood as having its functionality existing in a cloud computing region across multiple availability zones. This arrangement allows for load-balancing, redundancy, and fail-over. In local zones, multiple regional data centers can be logically present. Each of regional data centers may execute 5G core functions for a different geographic region or group of RAN components. An example of 5G core components that can be executed within an RDC are described in more detail with regard to FIG. 2. The data network 110 may be the Internet, an enterprise data network, combinations thereof, and the like.

Figure 2:
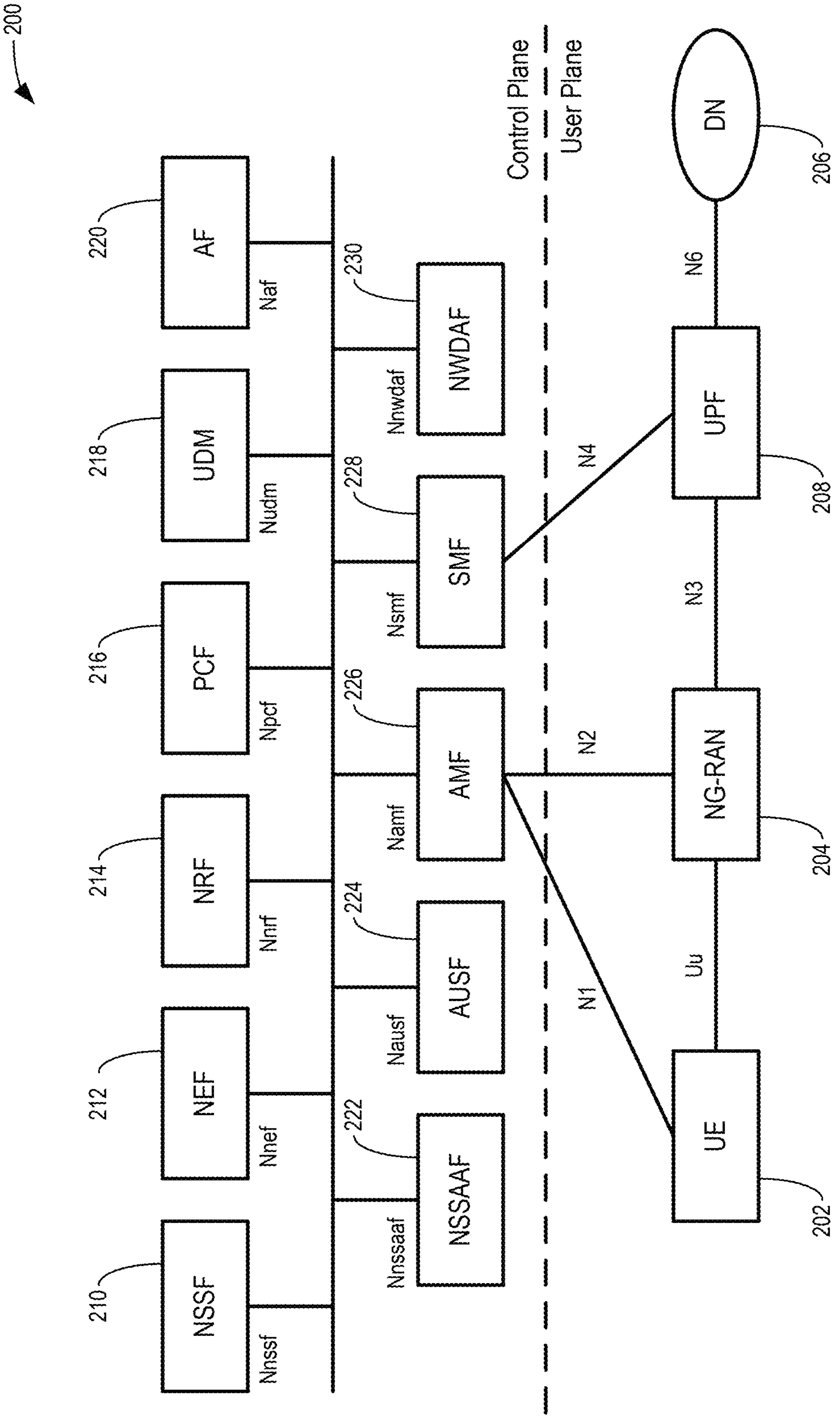
FIG. 2 illustrates an example of a service-based architecture for a telecommunications network in accordance with various aspects of the present disclosure.

FIG. 2 illustrates an example service-based architecture (SBA) 200 for a telecommunications network (e.g., the telecommunications network 100 of FIG. 1) in accordance with various aspects of the present disclosure. The SBA 200 includes an infrastructure domain, which is divided between a control plane (CP) and a user plane (UP). The CP comprises a plurality of CP network functions (NFs). The UP comprises a UE 202 (e.g., one of the UEs 102 of FIG. 1) connected to an NG-RAN 204, and UP NFs. Using the SBA 200, the UE 202 accesses a data network 206 (e.g., the data network 110 of FIG. 1). For ease of illustration, FIG. 2 only shows a single UE 202 being connected to the NG-RAN 204; however, in practical implementations any number of UEs 202 may be present, limited only by the capacity of the network.

The UP NFs include a User Plane Function (UPF) 208. The UPF 208 is a network function that routes and forwards user plane data packets between the base station (cell site; for example, the NG-RAN 204) and the external data network 206 (e.g., the Internet). The UPF 208 is similar to the service and packet gateway functions in a 4G network, but it is cloud-native and can be deployed anywhere to meet service requirements. It can also manage, prioritize, and duplicate data packets as they traverse the network, thus offering redundancy and quality-of-service (QoS) assurance.

The CP NFs include a Network Slice Selection Function (NSSF) 210, a Network Exposure Function (NEF) 212, a Network Repository Function (NRF) 214, a Policy Control Function (PCF) 216, a Unified Data Management (UDM) 218, an Application Function (AF) 220, a Network Slice-specific and SNPN Authentication and Authorization Function (NSSAAF) 222, an Authentication Server Function (AUSF) 224, an Access and Mobility Management Function (AMF) 226, a Session Management Function (SMF) 228, and a Network Data Analytics Function (NWDAF) 230. The orchestration domain includes an Element Management System (EMS) 232.

The NSSF 210 is a CP function that provides network slices to the AMF 226. A network slice is an independent, end-to-end logical network that runs on shared physical network infrastructure. It involves the allocation of network resources across all network infrastructure to meet specific service requirements, from the network core to the radio access network (RAN). Specific requirements may include QoS assurance, security policies, data isolation, dynamic policy management, etc.

The NEF 212 is a CP function that provides information regarding the network functions that are available to use (by the enterprise customer). It is similar to the 4G Service Capabilities Exposure Function (SCEF), but it is cloud-native and exposes event information, network monitoring, network control, provisioning capabilities, and policy/charging capabilities externally. This allows the enterprise customer to monitor and affect QoS and charging for devices.

The NRF 214 is a CP function that allows 5G network functions to be registered, discovered, and subsequently made available to customers. This is a unique capability in the standalone 5G network that allows consumer NFs to subscribe to the necessary microservices or to have dedicated network functions for their services. The NRF 214 will be described in more detail below.

The PCF 216 is a CP function that provides policies for mobility and session management. It is similar to the Policy and Charging Rules Function (PCRF) in a 4G network, but it is cloud-native and offers additional capabilities in the 5G network, including event-based policy triggers, resource reservation requests, and access network discovery and selection. The PCF directly influences QoS and subscriber spending limits, and as a result plays a role in the enhanced policy management and control capabilities of the 5G network.

The UDM 218 is a CP function that manages and stores subscriber and device information, default QoS and prioritization, authorized data channels, maximum bit rates, service continuity provisions, and the like. The UDM 218 is similar to the Home Subscriber Server (HSS) function in a 5G network, but it is cloud-native and designed for 5G services.

The AF 220 is a CP function that interacts with the 3GPP Core Network in order to provide services, for example to support one or more of application function influence on traffic routing, application function influence on service function chaining, accessing the NEF 212, interacting with the PCF 216, time synchronization service, IP multimedia subsystem (IMS) interactions with the 5GC, or packet data unit (PDU) set handling.

The NSAAF 222 is a CP function that supports authentication and authorization of slicing with an AAA server (Authentication, Authorization, and Accounting). It is a unique capability of the standalone 5G network that allows customers to access a predefined network slice or a newly requested network slice in real-time and using their own existing authentication infrastructure.

The AUSF 224 is a CP function that supports authentication for 3GPP access and untrusted non-3GPP access, and authentication of a UE for a disaster roaming service. It can act as an authentication server.

The AMF 226 is a CP function that manages registration, authorization, connection, reachability, and mobility. It is similar to the Mobility Management Entity (MME) function in a 4G network, but it is cloud-native and supports many additional capabilities unique to 5G. For example, it also supports dynamic updating of network interfaces and cellular sites, greater privacy via the use of a 5G temporary device identity, enhanced security across the user and control planes, and stores network slice information. It can also select an appropriate PCF for a device or use case.

The SMF 228 is a CP function that oversees packet data session management, IP address allocation, data tunneling from a cell site base station to the user plane function, and downlink notification management. It performs the tasks of the serving and packet gateways (S-GW & P-GW) in a 4G network, but also allows for control plane and user plane separation in 5G.

The NWDAF 230 is a CP function that collects data from pertinent network infrastructure relevant to a customer's services, including user equipment (device), network functions, network operations and administration, cloud, and edge that can be used for data analytics and insights. It is a unique standalone 5G network function that exposes full visibility to network performance and operations as they relate to a customer's key performance indicators (KPIs).

The SBA 200 further includes a plurality of service-based interfaces to provide access to or communication with the various NFs. As illustrated, these include an Nnssf interface for the NSSF 210, an Nnef interface for the NEF 212, an Nnrf interface for the NRF 214, an Npcf for the PCF 216, an Nudm interface for the UDM 218, an Naf interface for the AF 220, an Nnssaaf interface for the NSSAAF 222, an Nausf interface for the AUSF 224, an Namf interface for the AMF 226, an Nsmf interface for the SMF 228, and an Nnwdaf interface for the NWDAF 230. FIG. 2 also illustrates several reference points (i.e., interfaces between two NFs or entities), including an N1 interface between the UE 202 and the AMF 226, a Uu interface between the UE 202 and the NG-RAN 204, an N2 interface between the NG-RAN 204 and the AMF 226, an N3 interface between the NG-RAN 204 and the UPF 208, an N4 interface between the UPF 208 and the SMF 228, and an N6 interface between the UPF 208 and the data network 206.

The above-listed NFs and interfaces are intended to be illustrative and not exhaustive. In practical implementations, the SBA 200 may include additional NFs or other network entities, such as an Unstructured Data Storage Function (UDSF), a Network Slice Admission Control Function (NSCAF), a Unified Data Repository (UDR), a UE radio Capability Management Function (UCMF), a 5G-Equipment Identity Register (5G-EIR), a Charging Function (CHF), a Time Sensitive Networking AF (TSN AF), a Time Sensitive Communication and Time Synchronization Function (TSCTSF), a Data Collection Coordination Function (DCCF), an Analytics Data Repository Function (ADRF), a Messaging Framework Adaptor Function (MFAF), a Non-Seamless WLAN Offload Function (NSWOF), an Edge Application Server Discovery Function (EASDF), a Service Communication Proxy (SCP), a Security Edge Protection Proxy (SEPP), a Non-3GPP InterWorking Function (N3IWF), a Trusted Non-3GPP Gateway Function (TNGF), a Wireline Access Gateway Function (W-AGF), or a Trusted WLAN Interworking Function (TWIF).

Any of the NFs illustrated in FIG. 2 and/or described above may be implemented as a software unit residing on a server (i.e., in the cloud). Each NF can include multiple pods. A "pod" refers to a software sub-component of the NF. Kubernetes, Docker, or some other container orchestration platform can be used to create and destroy the logical CU or 5G core units and subunits as needed for the data network 110 to function properly. The pods may be deployed on one or more virtual machines configured by a network operator. Kubernetes allows for container deployment, scaling, and management. As an example, if cellular traffic increases substantially in a region, an additional logical CU or components of a CU may be deployed in a data center near where the traffic is occurring without any new hardware being deployed. Instead, processing and storage capabilities of the data center would be devoted to the needed functions. When the need for the logical CU or subcomponents of the CU no longer exists, Kubernetes can allow for removal of the logical CU. Kubernetes can also be used to control the flow of data (e.g., messages) and inject a flow of data to various components. This arrangement can allow for the modification of nominal behavior of various layers. Thus, the SBA 200 may be implemented on or using one or more computing devices, each of which includes a processor and a memory.

As used herein, a "processor" may include one or more individual electronic processors, each of which may include one or more processing cores, and/or one or more programmable hardware elements. The processor may be or include any type of electronic processing device, including but not limited to central processing units (CPUs), graphics processing units (GPUs), application-specific integrated circuits (ASICs), field-programmable gate arrays (FPGAs), microcontrollers, digital signal processors (DSPs), or other devices capable of executing software instructions. When a device is referred to as "including a processor," one or all of the individual electronic processors may be external to the device (e.g., to implement cloud or distributed computing). In implementations where a device has multiple processors and/or multiple processing cores, individual operations described herein may be performed by any one or more of the microprocessors or processing cores, in series or parallel, in any combination. In some implementations, one or more of the processing units or processing cores may be remote (e.g., cloud-based).

As used herein, a "memory" may be any storage medium, including a non-volatile medium, e.g., a magnetic media or hard disk, optical storage, or flash memory; a volatile medium, such as system memory, e.g., random access memory (RAM) such as dynamic RAM (DRAM), synchronous dynamic RAM (SDRAM), static RAM (SRAM), extended data out (EDO) DRAM, extreme data rate dynamic (XDR) RAM, double data rate (DDR) SDRAM, etc. ; on-chip memory; and/or an installation medium where appropriate, such as software media, e.g., a CD-ROM, or floppy disks, on which programs may be stored and/or data communications may be buffered. The term "memory" may also include other types of memory or combinations thereof. For the avoidance of doubt, cloud storage is contemplated in the definition of memory. A memory is an example of a non-transitory computer-readable medium which stores instructions that are executable by a processor (or processors), the execution of which causes the executing device (e.g., a computer) to perform certain operations, such as those operations described herein.

In the SBA 200 shown in FIG. 2, the NG-RAN 204 may include some or all of the virtualized RAN components 106 illustrated in FIG. 1. Thus, the NG-RAN 204 may include at least one CU, at least one DU configured to operate under the control of one or more of the at least one CU, and at least one RU configured to operate under the control of one or more of the at least one DU. For example, each CU in the NG-RAN 204 may control a plurality of Dus, each of which in turn may control a plurality of RUs. Each RU may be operatively connected to a power amplifier and transmission elements (e.g., antennae) configured to cooperate to transmit signals to connected Ues 202 according to a transmission schedule.

The NRF 214 supports several functions, implemented as microservices, related to the NFs and their interaction. For example, the NRF 214 offers a NF management microservice Nnrf_NFManagement, which allows an NF to register, update, or deregister its profile in the NRF 214; a NF discovery microservice Nnrf_NFDiscovery, which allows an NF to discover other NF instances and the corresponding services offered; an access microservice Nnrf_AccessToken, which provides Oauth2 authorization services; a boostrapping microservice Nnrf_Bootstrapping, which informs an NF consumer about the services offered by the NRF 214 without the need for any discovery service; and so on.

The NF management microservice provides several service operations. These include a registration operation NFRegister, which allows an NF to register its profile in the NRF 214; a deregistration operation NFDeregister, which allows an NF to deregister its profile from the NRF 214; an update operation NFUpdate, which allows an NF to replace, or partially update, the parameters of its profile (including the parameters of any associated services) in the NRF 214 and allows addition or deletion of individual services offered by the NF Instance; a status subscription operation NFStatusSubscribe, which allows an NF to subscribe to changes on the status of NF Instances registered in the NRF 214; a status notification operation NFStatusNotify, which allows the NRF to notify the subscribed NF(s) of changes on the status of NF Instances; and so on. Herein, an NF that is subscribed to updates is referred to as a "consumer NF," and an NF that is the subject of the subscription is referred to as the "producer NF." In other words, a consumer NF may request, from the NRF 214, updates regarding changes in the status of the producer NF.

However, in some instances a producer NF may undergo a large amount of status changes in a short amount of time. Each status chance triggers a notification from the NRF 214 to the consumer NF. If the notification load becomes too high, the consumer NF may break down, affecting user service. The present disclosure provides for a notification control mechanism for the NRF 214, and has the ability to control the notification trigger and in turn reduce the transaction per second (TPS) load. The notification control mechanism reduces or prevents consumer NF breakdown resulting from a larger volume of notifications triggered by a producer NF through the NRF 214. The notification control mechanism may work in tandem with the status notification operation NFStatusNotify, and thus (in addition to preventing breakdown) provides for improved ease of management and seamless scalability with expansion of the network.

Figure 3:
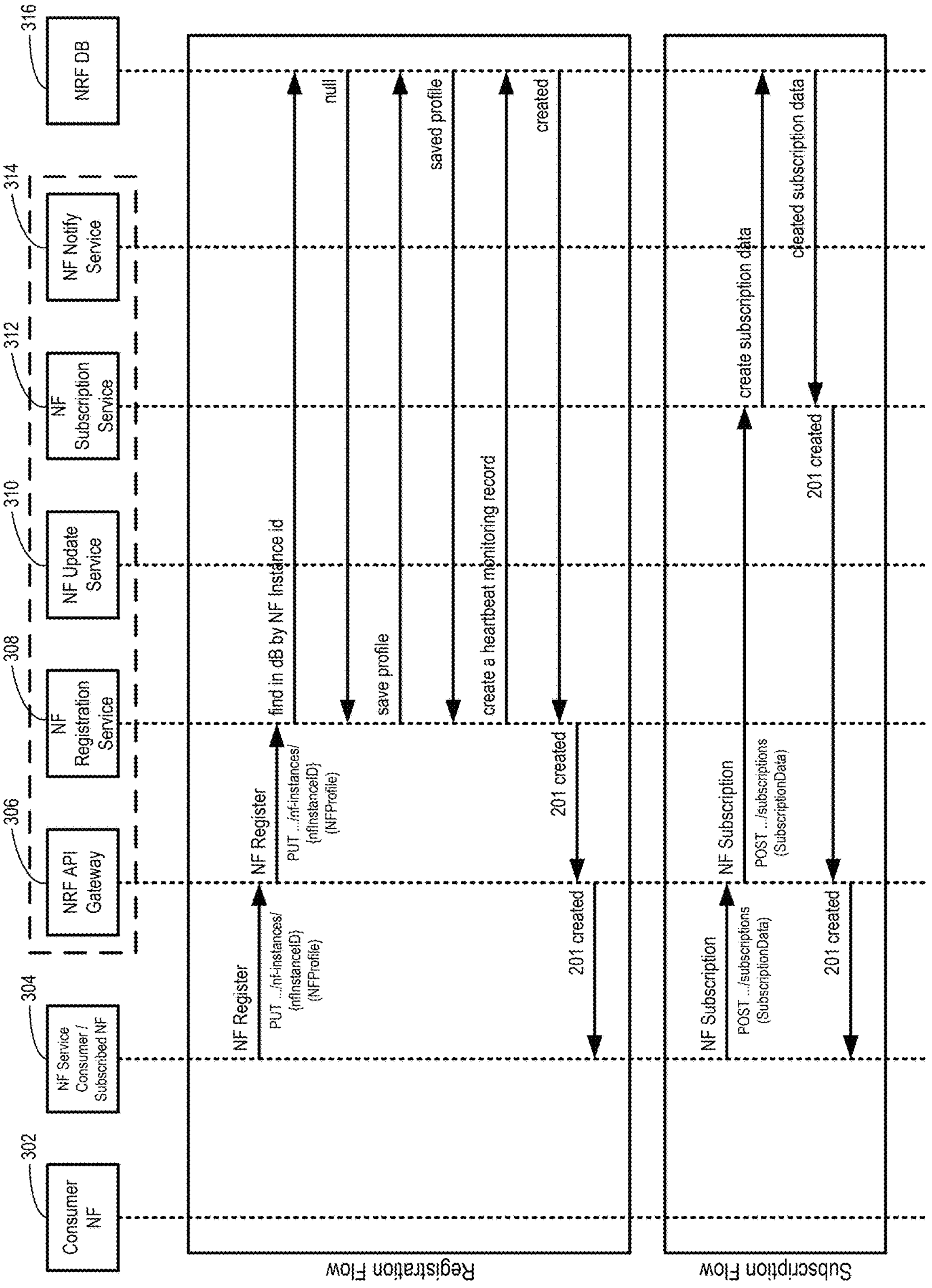
FIG. 3 illustrates an example of a communication flow, in accordance with various aspects of the present disclosure.
Figure 3:
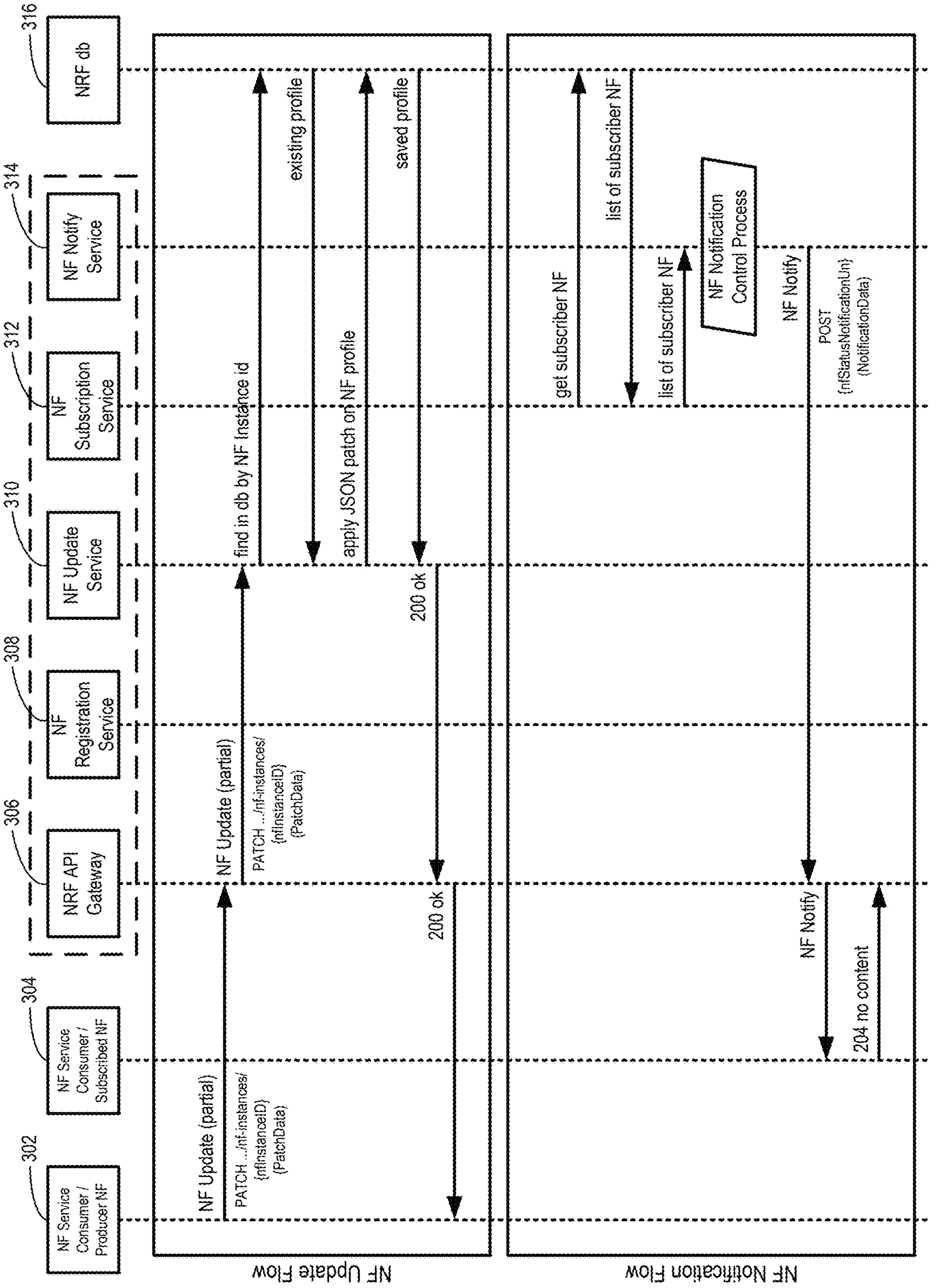

FIG. 3 illustrates an example message flow among various NFs in a cloud-native telecommunication network, and implements a notification control mechanism in accordance with the present disclosure. In particular, FIG. 3 illustrates a message flow for a registration operation, a subscription operation, an NF update operation, and an NF notification operation. Communication is shown among a first NF Service Consumer 302 (the producer NF); a second NF Service Consumer 304 (the subscribed NF, also referred to as a "Consumer NF"); several microservices of the NRF 214 such as an NRF API Gateway 306, an NF Registration Service 308, an NF Update Service 310, an NF Subscription Service 312, and an NF Notify Service 314; and an NRF database 316. Note that both the Producer NF 302 and the Subscribed NF 304 are "consumers" for the purposes of NRF services, but the Producer NF 302 is considered to be the "producer" and the Subscribed NF 304 is considered to be the "consumer" for purposes of notifications. In one example, the Producer NF 302 may be the PCF and the Subscribed NF 304 may be the SMF. The SMF consumes notifications and the PCF produces notifications, even though both the SMF and PCF consume NRF services.

First, the message flow for the registration operation is shown. This operation begins with the Consumer NF 304 sending a PUT request to the NRF API Gateway 306. The PUT request includes a variable {nfInstanceID} representing an identifier that is globally unique within the area of control of the NRF 214, and a payload body representing the NF Instance to be created. The NRF API Gateway 306 forwards the PUT request to the NF Registration Service 308, which in turn queries the NRF database 316 to determine whether the identifier is in use. If the identifier is not in use and is thus valid and globally unique, the NRF API Gateway 306 requests that the NRF database 316 save a profile and create a heartbeat monitoring record corresponding to the Subscribed NF 304. If this is successful, a "201 Created" message is returned by the NF Registration Service 308 to the Subscribed NF 304 (via the NRF API Gateway 306). If this is not successful, however, a "400 Bad Request" (if the registration fails due to encoding errors) or "500 Internal Server Error" (if the registration fails due to NRF internal errors) would instead be returned by the NF Registration Service 308 to the Consumer NF 304.

Thereafter, the message flow for the subscription operation is shown. This operation begins with the Subscribed NF 304 sending a POST request to the NRF API Gateway 306. The POST request includes a payload body indicating the type of notifications that the Subscribed NF 304 is subscribing to receive. The payload body may further include additional parameters indicating a list of attributes in the NF Profile to monitor and/or to exclude from monitoring. Together, the data in the payload body determines whether the NRF 214 sends a notification when there is a change in any of the profile attributes. The NRF API Gateway 306 forwards the POST request to the NF Subscription Service 312, which in turn sends a message to the NRF database 316 to create subscription data. If the subscription creation is successful, the NRF database 316 returns the created subscription data to the NF Subscription Service 312, which returns a "201 Created" message to the Subscribed NF 304 (via the NRF API Gateway 306). If the subscription fails, however, a "400 Bad Request" (if the subscription fails due to errors in the subscription data) or "500 Internal Server Error" (if the subscription fails due to NRF internal errors) would instead be returned by the NF Subscription Service 312 to the NF Service Consumer 304.

Next, the message flow for an example NF profile update operation is shown. The illustrated example corresponds to a partial update; that is, an update that applies only to a subset of the parameters of the profile (including adding/deleting/replacing services to the NF profile). This operation begins with the Producer NF 302 sending an HTTP PATCH request to the NRF API Gateway 306. The PATCH request includes a variable {nfInstanceID} representing a unique identifier for the Producer NF 302, and a payload body containing the list of operations (add/delete/replace) to be applied to the NF Profile of the Consumer NF 302 Instance. These operations may be directed to individual parameters of the NF Profile or to the list of services. The NRF API Gateway 306 forwards the PATCH request to the NF Update Service 310, which in turn queries the NRF database 316 for the NF Instance ID corresponding to the Producer NF 302. If a profile corresponding to the NF Instance ID exists, the NF Update Service 310 sends a message causing the NRF database 316 to patch the NF Profile. The NRF database 316 returns the saved profile to the NF Update Service 310. If this operation is successful, a "200 OK" message is returned by the NF Update Service 310 to the Producer NF 302 (via the NRF API Gateway 306). If this is not successful, however, a "400 Bad Request" (if the NF profile update fails due to encoding errors in the JSON profile object) or "500 Internal Server Error" (if the NF profile update fails due to NRF internal errors) would instead be returned by the NF Update Service 310 to the Producer NF 302.

If the NF profile update operation were instead a total update (that is, an update that applies to the whole profile of the NF, such as complete replacement of the existing profile by a new profile), the operation would instead begin with the Producer NF 302 sending an HTTP PUT request to the NRF API Gateway 306. Like the PATCH request, the PUT request includes the variable {nfInstanceID} representing the unique identifier for the Producer NF 302. However, the payload body instead includes a representation of the NF Instance to be completely replaced in the NRF 214. The remainder of the total update message flow may be the same as the partial update message flow described above and illustrated in FIG. 3.

Finally, the message flow for a NF notification operation is shown. The NF notification operation notifies each NF Service Consumer that was previously subscribed to receiving notifications of registration/deregistration of NF Instances and/or notifications of changes of the NF profile of a given NF Instance. Once the NF profile update operation is completed, the NF Subscription Service 312 sends a message to the NRF database 316 requesting a list of subscriber NFs, and the list is returned by the NRF database 316 to the NF Subscription Service 312. The NF Subscription Service 312 provides the list to the NF Notify Service 314. Unlike in comparative examples, according to the present disclosure a NF Notification Control Process is performed. This process is illustrated in FIG. 4.

Figure 4:
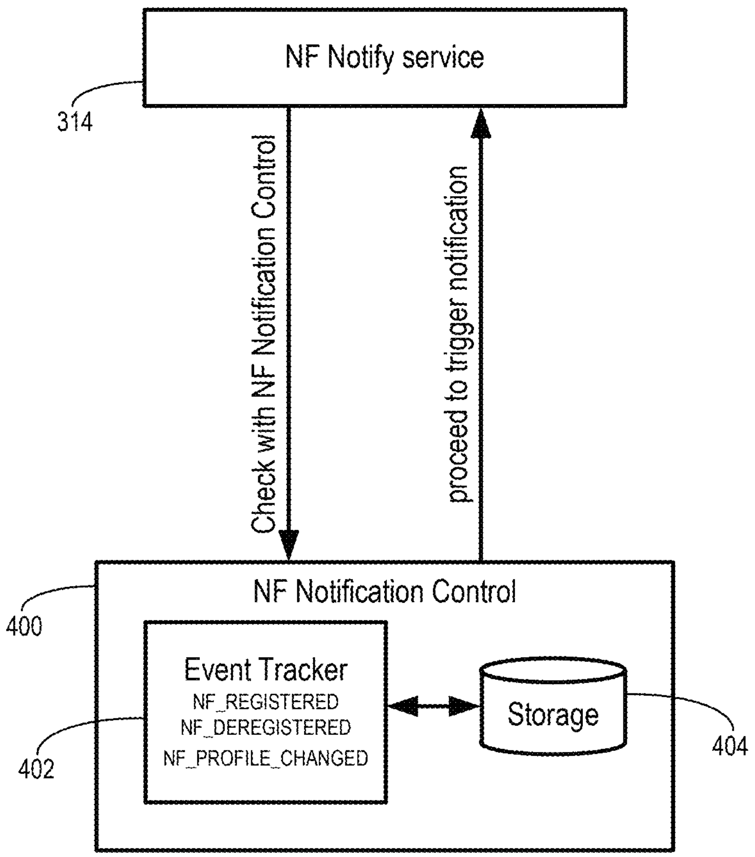
FIG. 4 illustrates an example of a NF notification control process in accordance with various aspects of the present disclosure.

As shown in FIG. 4, the NF Notify Service 314 is in communication with an NF Notification Control 400. The Notification Control 400 may be an additional microservice of the NRF 214. The NF Notification Control 400 includes an event tracker 402 and a storage 404. Upon receiving the list of subscriber NFs from the NF Subscription Service 312, the NF Notify Service 314 sends a check message to the NF Notification Control 400. In response to the check message, the NF Notification Control 400 determines whether a notification would, if transmitted to the Subscribed NF 304, cause an error in the Subscribed NF 304. The error may occur if a large volume of notifications is triggered by the Producer NF 302 (either itself or in combination with notifications triggered by other NFs). Thus, the NF Notification Control 400 may base its determination on parameters related to at least one of a processing capability (e.g., capacity) of the Subscribed NF 304, a memory capability (e.g., capacity) of the Subscribed NF 304, a notification frequency or load for transmissions to Subscribed NF 304 (e.g., number of notifications per millisecond or within another given time window), or data indicative of an importance of the notification. In making this determination, the event tracker 402 may store information regarding a series of events, such as which types of notifications have been sent, the date/time at which the notifications have been sent, and so on. For example, the event tracker 402 may store information in the storage 404 relating to the event data structure that would be included in the notification (if sent) and/or relating to the event data structure that is associated with past notifications. The event data structure will be described in more detail below. If the NF Notification Control 400 determines that the notification is safe to send (e.g., that it is not expected to cause any errors in the consumer NF), the Notification Control 400 returns a message requesting that the NF Notify Service 314 proceed with the notification. If NF Notification Control 400 determines that the notification should not be sent, the Notification Control 400 may prevent the transmission of the notification (e.g., by sending a prevent message to the NF Notify Service 314), may cause a delay before any notification is sent (e.g., by delaying the proceed message to the NF Notify Service 314 or by requesting the NF Notify Service 314 delay the notification before proceeding), may generate an error log indicating a problem with the Producer NF 302 (e.g., by causing the NRF 214 to transmit a message to the Producer NF 302, by informing the NRF 214 of a potential error in the Producer NF 302, and/or by informing a network operator), or combinations thereof.

Returning to FIG. 3, if the NF Notification Control Process 400 indicates that the notification may be safely sent, the NF Notify Service 314 sends the notification in the form of a POST request to the Subscribed NF 304 via the NRF API Gateway 306. The POST request includes a request body, which includes an event data structure, an nfInstanceUri data structure, an nfProfile data structure, and a profileChanges data structure. The event data structure is an attribute that indicates the notification type, and may be "NF_REGISTERED," "NF_DEREGISTERED," or "NF_PROFILE_CHANGED" depending on the NF profile update operation. The nfInstanceURI data structure indicates the Uniform Resource Identifier (URI) of the NF Instance associated to the notification event. The nfProfile data structure indicates the new or updated NF profile. The profileChanges data structure is an attribute that identifies changes on the profile of the NF Instance associated to the notification event, and is available when the event data structure indicates NF_PROFILE_CHANGED. If the notification is successful, the Subscribed NF 304 sends a "204 No Content" message to the NRF API Gateway 306. If the notification is unsuccessful, the Subscribed NF 304 instead sends a "404 Not Found" error message (if the error is caused by a mismatch in the nfInstanceUri data) or a 3xx status code (in the case of redirection).

Figure 5:
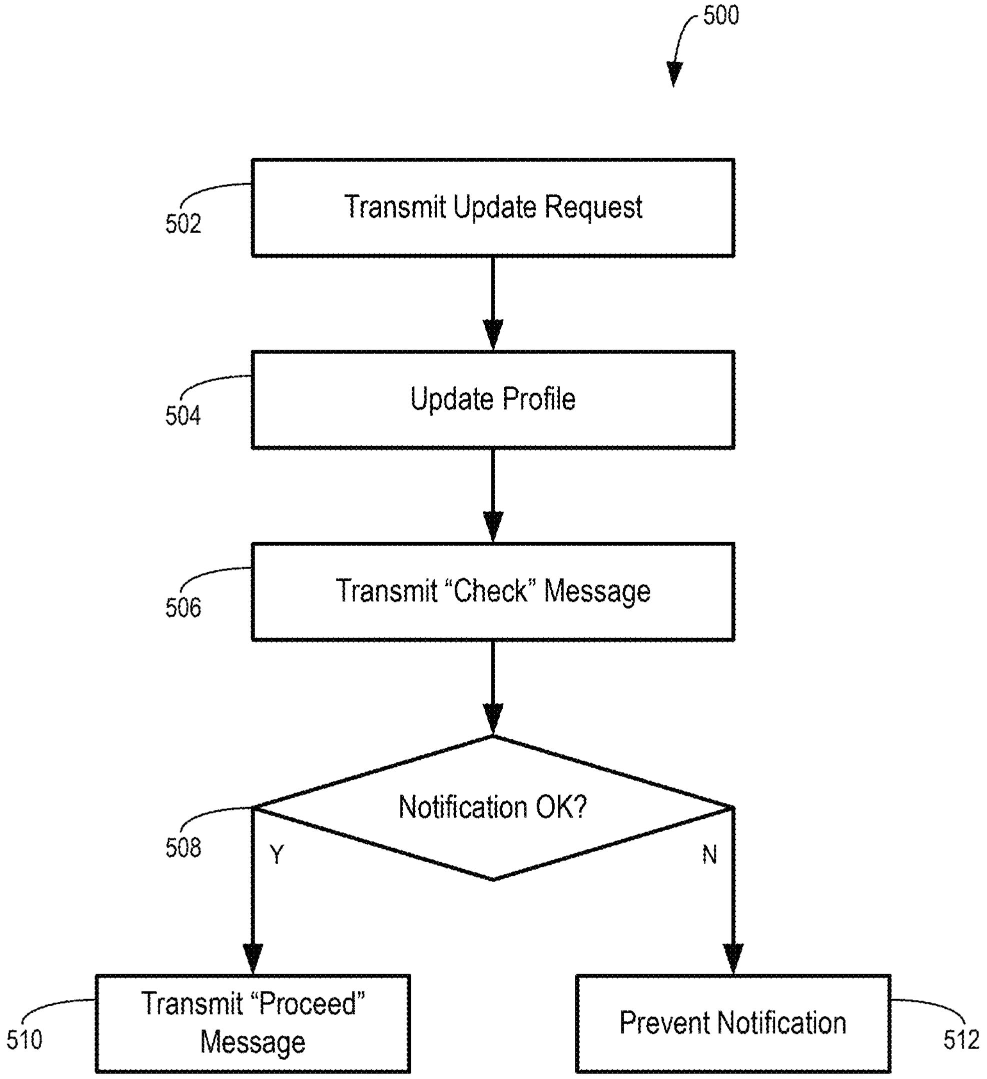
FIG. 5 illustrates an example of a notification control method in accordance with various aspects of the present disclosure.

FIG. 5 illustrates an example method 500 for controlling notifications in a telecommunications network (e.g., a cloud-native 5G network). The method 500 may be performed by a device or combination of devices in the telecommunications network that provide NF services. In one example, the method 500 may be performed at least in part by a network node corresponding to an NRF, and in some implementations may also be partially performed by another network node that is a consumer of NRF services.

The method 500 begins with an operation 502 of transmitting an update request. The update request may be transmitted from a first network node (e.g., from the Producer NF 302 as shown in FIG. 3) to a second network node that is associated with a "producer NF" that consumes services provided by the NRF (e.g., to the NRF API Gateway 306 microservice of the NRF 214 as shown in FIG. 3). In some implementations, however, a message between different microservices internal to the same NF may be considered as the update request, such that the first and second network nodes are microservices of the same NF (e.g., transmitting from the NRF API Gateway 306 to the NRF Update Service 310 of FIG. 3).

Based on the update request of operation 502, at operation 504 a profile associated with the source of the update request (e.g., the producer NF, which may correspond to the second network node). Operation 504 may correspond to the message flow beginning with "find in db by NF Instance id" and ending with "200 OK" as illustrated in the NF Update Flow of FIG. 3. Then, the method 500 includes a process of determining whether a notification corresponding to the update request is expected to cause an error in a third network node that is associated with a "consumer NF" that consumes services provided by the NRF (e.g., the Consumer NF 304 shown in FIG. 3). The error may be any event which causes the third network node to fail or which otherwise degrades the performance of the third network node. For example, if the notification load becomes too high, the third network node may dedicate a large amount of processing resources to handling the notification load and thus may not have sufficient remaining processing resources to handle the tasks required of the third network node. The overall process of determining may include operations 506 and 508, which will be described in more detail below. This operation of determining may be performed by a Notification Control microservice (e.g., NF Notification Control 400 of FIG. 4) of the NRF 214.

The process of determining may include an operation 506 of transmitting a check request message from a first microservice of the NRF 214 to a second microservice of the NRF 214 (e.g., from the NF Notify service 314 to the NF Notification Control 400 as shown in FIG. 4). Next, the second microservice performs an operation 508 of determining whether the notification is expected to cause the error, in response to the check request message. The determination may be based on at least one of a processing capability of the third network node, a memory capability of the third network node, or a notification frequency or load for transmissions to the third network node. For example, the second microservice may determine that an error will occur (or is likely to occur) if the notification frequency and/or load is above a threshold; if the notification will cause (or is likely to cause) the remaining processing and/or memory capability of the third network node to drop below a threshold, and the like. If the second microservice determines that the notification is not expected to cause the error, at operation 510 a proceed message may be transmitted from the second microservice of the NRF 214 to the first microservice of the NRF 214 (e.g., from the NF Notification Control 400 to the NF Notify service 314 as shown in FIG. 4). In response to this determination, the second network node may transmit the notification to the third network node. This transmission operation may correspond to the message flow beginning with "NF Notify" and ending with "204 no content"as illustrated in the NF Notification Flow of FIG. 3.

If, on the other hand, it is determined at operation 508 that the message is expected to cause the error, at operation 512 the second microservice may prevent transmission of the notification. This may be accomplished by, for example, transmitting a "do not proceed" message from the second microservice to the first microservice (e.g., from the NF Notification Control 400 to the NF Notify service 314 as shown in FIG. 4). Alternatively, this may be accomplished by simply not responding to the check request message. Operation 512 may additionally or alternatively include causing a delay before transmitting the notification from the second network node to the third network node and/or transmitting an error message from the second network node to the first network node and/or to a network operator.

Figure 6:
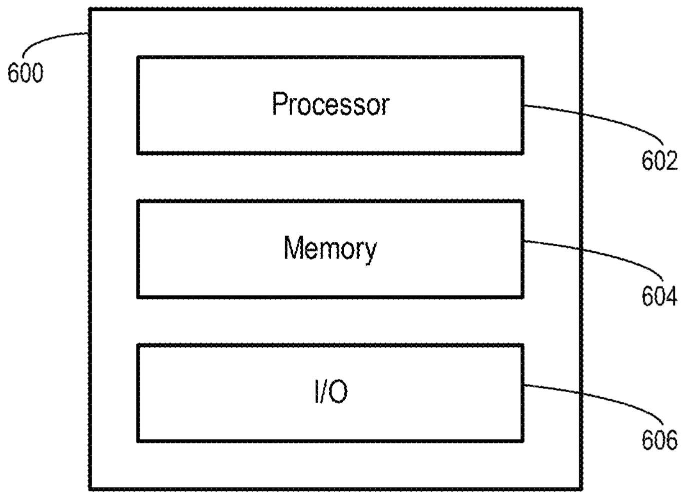
FIG. 6 illustrates an example of a notification control coordination system in accordance with various aspects of the present disclosure.

The method 500 may be implemented by a device or combination of devices operating in a telecommunications network. For example, in a telecommunications network including a first network node associated with an NRF, a second network node associated with a producer NF, and a third network node associated with a consumer NF, each network node may correspond to components of a cloud-native core network server (e.g., 5GC 108 of FIG. 1). FIG. 6 illustrates one example of a cloud-native core network server 600. The cloud-native core network server 600 is an example of a notification control system discussed above, and may be implemented as a set of network nodes. The network nodes may be located at a site level (e.g., a network level, a geographic level, etc.) of the telecommunications network, and may control scheduling operations for one or more wireless access points (e.g., one or more DUs, one or more RUs, etc.) in the network.

As illustrated, the cloud-native core network server 600 comprises a processor 602, a memory 604, and an input/output (I/O) interface 606. The cloud-native core network server 600 may be configured with various modules (e.g., various software modules) to implement network management functions, such as network repository functions. In some implementations, the cloud-native core network server 600 may be configured to generate and maintain virtual machines corresponding to the different network nodes. In other implementations, however, the cloud-native core network server 600 itself may correspond to one of the above described network nodes, and additional cloud-native core network servers 600 may be provided corresponding to others of the above described network nodes.

In one example, the modules may be present in the memory 604 in the form of instructions that, when executed by the processor 602, cause the cloud-native core network server 600 to perform any one or more of the operations described herein. In another example, the processor 602 may be configured to load and/or execute instructions from another non-transitory computer-readable medium (e.g., cloud storage or from the memory of another device). In some examples, the following modules may be in the form of xApps and/or rApps (or portions or combinations thereof).

The cloud-native core network server 600 may comprise a data receipt module configured to receive, for example, an update request. The cloud-native core network server 600 may comprise a logic module to perform certain determinations and other logical operations. For example, the logic module may be configured to update a profile based on the update request and/or to determine whether a notification is expected to cause an error. The cloud-native core network server 600 may further comprise a data transmission module configured to transmit, for example, the notification. The I/O 606 may include interface components to permit the communication of data to and from external devices or sources. For example, the I/O 606 may include communication ports and/or interfaces to permit communication with other computer devices. The communication ports and/or interfaces may permit input and output via wired protocols (e.g., Ethernet, Universal Serial Bus (USB), FireWire, etc.) and/or wireless protocols (e.g., Wi-Fi, Bluetooth, Near Field Communication (NFC), 5G, 4G, etc.). The I/O 606 may additionally or alternatively include communication ports and/or interfaces to permit communication with a user. For example, the I/O 606 may include interfaces for a mouse, a keyboard, a display, a graphical user interface (GUI), buttons, switches, etc.

Other examples and uses of the disclosed technology will be apparent to those having ordinary skill in the art upon consideration of the specification and practice of the invention disclosed herein. The specification and examples given should be considered exemplary only, and it is contemplated that the appended claims will cover any other such embodiments or modifications as fall within the true scope of the invention.

The Abstract accompanying this specification is provided to enable the United States Patent and Trademark Office and the public generally to determine quickly from a cursory inspection the nature and gist of the technical disclosure and in no way intended for defining, determining, or limiting the present invention or any of its embodiments.

What is claimed is:

1. A method of controlling notifications in a telecommunications network, the method comprising:

transmitting an update request from a first network node to a second network node, wherein the second network node is associated with a Network Repository Function (NRF) and the first network node is associated with a producer Network Function (NF) that is a first consumer of services provided by the NRF;

updating a profile associated with the producer NF based on the update request;

determining whether a notification corresponding to the update request is expected to cause an error in a third network node, wherein the third network node is associated with a consumer NF that is a second consumer of services provided by the NRF and is subscribed to updates regarding the first network node; and in response to a determination that the notification is not expected to cause the error, transmitting the notification from the second network node to the third network node.

2. The method of claim 1, wherein the operation of determining is performed by a notification control microservice of the NRF.

3. The method of claim 1, wherein the determination whether the notification is expected to cause the error is based on at least one of a processing capability of the third network node, a memory capability of the third network node, or a notification frequency or load for transmissions to the third network node.

4. The method of claim 1, further comprising:

transmitting a check request message from an NF Notify microservice of the NRF to a notification control microservice;

performing the operation of determining in response to the check request message; and in response to the determination that the notification is not expected to cause the error, transmitting a proceed message from the notification control microservice to the NF Notify microservice of the NRF.

5. The method of claim 1, further comprising:

in response to a determination that the notification is expected to cause the error, preventing the transmission of the notification from the second network node to the third network node.

6. The method of claim 1, further comprising:

in response to a determination that the notification is expected to cause the error, causing a delay before transmitting the notification from the second network node to the third network node.

7. The method of claim 1, further comprising:

in response to a determination that the notification is expected to cause the error, transmitting an error message from the second network node to a network operator.

8. A telecommunications network comprising:

at least one processor in communication with a first network node, wherein the first network node is associated with a Network Repository Function (NRF); and a memory storing instructions that, when executed by the at least one processor, cause the first network node to:

receive an update request from a second network node, wherein the second network node is associated with a producer Network Function (NF) that is a first consumer of services provided by the NRF, update a profile associated with the producer NF based on the update request, determine whether a notification corresponding to the update request is expected to cause an error in a third network node, wherein the third network node is associated with a consumer NF that is a second consumer of services provided by the NRF and is subscribed to updates regarding the second network node, and in response to a determination that the notification is not expected to cause the error, transmit the notification from the first network node to the third network node.

9. The telecommunications network according to claim 8, wherein the first network node is configured to implement a plurality of microservices including a notification control microservice of the NRF, and the operation of determining is performed by the notification control microservice.

10. The telecommunications network according to claim 8, wherein the determination whether the notification is expected to cause the error is based on at least one of a processing capability of the third network node, a memory capability of the third network node, or a notification frequency or load for transmissions to the third network node.

11. The telecommunications network according to claim 8, wherein the instructions, when executed by the at least one processor, further cause the first network to:

transmit a check request message from an NF Notify microservice of the NRF to a notification control microservice;

performing the operation of determining in response to the check request message; and in response to the determination that the notification is not expected to cause the error, transmit a proceed message from the notification control microservice to the NF Notify microservice of the NRF.

12. The telecommunications network according to claim 8, wherein the instructions, when executed by the at least one processor, further cause the first network to:

in response to a determination that the notification is expected to cause the error, prevent the transmission of the notification from the first network node to the third network node.

13. The telecommunications network according to claim 8, wherein the instructions, when executed by the at least one processor, further cause the first network to:

in response to a determination that the notification is expected to cause the error, cause a delay before transmitting the notification from the first network node to the third network node.

14. The telecommunications network according to claim 8, wherein the instructions, when executed by the at least one processor, further cause the first network to:

in response to a determination that the notification is expected to cause the error, transmitting an error message from the first network node to a network operator.

15. A non-transitory computer-readable medium storing instructions that, when executed by at least one processor of a first network node in a telecommunications network, cause the first network node to perform operations comprising:

receiving an update request from a second network node, wherein the first network node is associated with a Network Repository Function (NRF) and the second network node is associated with a producer Network Function (NF) that is a first consumer of services provided by the NRF;

updating a profile associated with the producer NF based on the update request;

determining whether a notification corresponding to the update request is expected to cause an error in a third network node, wherein the third network node is associated with a consumer NF that is a second consumer of services provided by the NRF and is subscribed to updates regarding the first network node; and in response to a determination that the notification is not expected to cause the error, transmitting the notification from the first network node to the third network node.

16. The non-transitory computer-readable medium of claim 15, wherein the operation of determining is performed by a notification control microservice of the NRF.

17. The non-transitory computer-readable medium of claim 15, wherein the determination whether the notification is expected to cause the error is based on at least one of a processing capability of the third network node, a memory capability of the third network node, or a notification frequency or load for transmissions to the third network node.

18. The non-transitory computer-readable medium of claim 15, the operations further comprising:

transmitting a check request message from an NF Notify microservice of the NRF to a notification control microservice;

performing the operation of determining in response to the check request message; and in response to the determination that the notification is not expected to cause the error, transmitting a proceed message from the notification control microservice to the NF Notify microservice of the NRF.

19. The non-transitory computer-readable medium of claim 15, the operations further comprising:

in response to a determination that the notification is expected to cause the error, preventing the transmission of the notification from the first network node to the third network node.

20. The non-transitory computer-readable medium of claim 15, the operations further comprising:

in response to a determination that the notification is expected to cause the error, causing a delay before transmitting the notification from the first network node to the third network node.

* * * * *